Jan. 28, 1964    R. E. SCHULZE ET AL    3,119,522
METERING DEVICE
Filed April 12, 1961    2 Sheets-Sheet 1

Inventors.
Robert E. Schulze.
Robert J. Tauch.
Christian W. Kruckeberg.
By. Wilson & Depper
Attorneys.

Jan. 28, 1964  R. E. SCHULZE ET AL  3,119,522
METERING DEVICE
Filed April 12, 1961  2 Sheets-Sheet 2
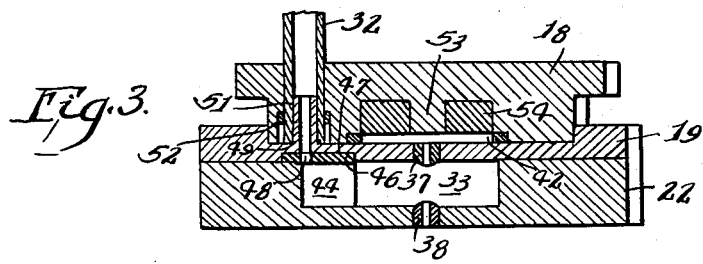
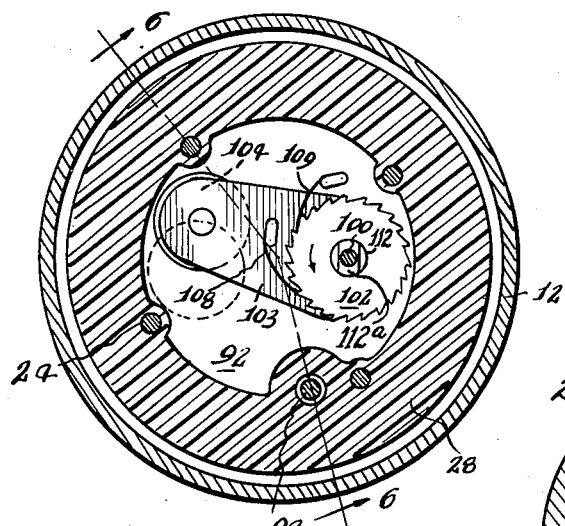
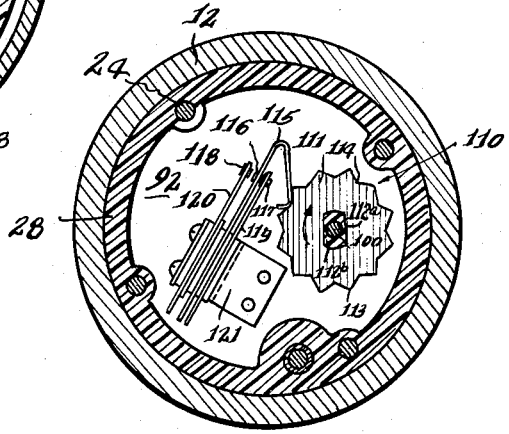
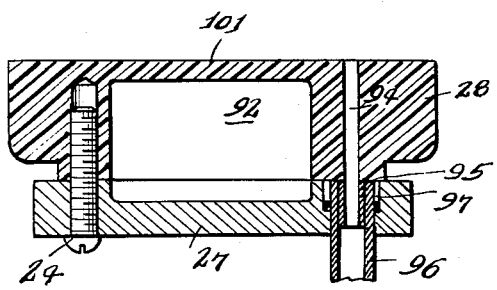
Inventors.
Robert E. Schulze,
Robert J. Tauch.
Christian W. Kruckeberg.
By. Wilson & Depper
Attorneys.

United States Patent Office 3,119,522
Patented Jan. 28, 1964

3,119,522
METERING DEVICE
Robert E. Schulze, Deerfield, Ill., and Robert J. Jauch and Christian W. Kruckeberg, Fort Wayne, Ind., assignors to Culligan, Inc., Northbrook, Ill., a corporation of Delaware
Filed Apr. 12, 1961, Ser. No. 102,483
21 Claims. (Cl. 222—23)

The present invention relates to a liquid measuring device and more particularly to a novel metering mechanism which measures the volume of liquid passing through a conduit by a cycling diaphragm actuated through the pressure differential in a flow restriction in the conduit.

In previous meters, the accuracy of the meter is limited over a relatively narrow range of flow rates due to the frictional losses involved in the metering mechanism. This was especially true for low flow rates where a meter is very inaccurate to the point of being totally inoperative. The meter in most common use for measuring flow and volume of water is the nutating disc meter which has large frictional losses occurring between the disc and its housing. Another type of meter is the reciprocating piston meter which utilizes a counter to totalize a number of measured increments of the fluid passing through the meter.

The present invention relates to a new and improved cyclic metering device for measuring fluid flow which includes a counter to totalize the small measured increments of the total fluid flow. In a pipe or conduit having an orifice therein, the total flow of liquid can be determined by measuring a much smaller flow of the liquid passing through an orifice in a smaller branch conduit connected in parallel with the main conduit. Knowing the ratio of the orifices in the main conduit and in the branch conduit, by measuring the flow in the small conduit, the volume passing through the main conduit and the total volume through both conduits can be accurately and readily determined.

In the present invention, the cyclic metering device is placed in communication with pressure taps prior to and at the throat of a Venturi tube. Also using an orifice in one or both taps will give a variable ratio of the orifice opening to the Venturi throat so that total flow can be determined by flow through the metering device.

An important object of the present invention relates to a new and improved metering device utilizing a thin flexible diaphragm within the meter chamber. This type of meter is more efficient, especially in the low flow rate range since with a thin diaphragm there is a minimum of friction to hinder movement of the diaphragm during its cycle. Further, the diaphragm will be actuated with a minimum of pressure differential acting on the diaphragm.

Another important object of the present invention is the provision of a novel water metering device which can be used in a multi-tank softener system where at least one tank is treating hard water and at least one other tank is simultaneously being regenerated. By passing a known volume of water through the meter, the total volume of water passing through the main conduit can be determined. The water metering device, after a given number of cycles, will signal a control mechanism which will switch fluid flow to the regenerated tank and simultaneously start the exhausted tank on a regeneration cycle. The number of cycles completed before signalling the control mechanism may be altered as required or desired.

Another object of the present invention is the provision of a novel four-way valve actuated by magnetic forces. The valve includes a pair of magnets mounted in valve chambers, each magnet hinged at its outer edge in the wall of the chamber. These magnets include resilient central plugs which engage upper and lower valve ports in each chamber to direct the flow of liquid in a particular direction or flow path. The magnetic field created causes the valve magnets to move in opposite directions so that the upper port in one chamber and the lower port in the other chamber will be simultaneously opened or closed. A magnet spaced above one of the hinged magnetic valves will attract this valve unless a reciprocating magnet is in a position adjacent the valve chamber containing said valve magnet.

A further object of the present invention is the provision of a novel counting mechanism which will count the cycles of movement of an actuating body. The mechanism includes a pivoted arm having a magnet at its extremity which is attracted by a second magnet which reciprocates toward and away from the arm. The movement of the arm intermittently rotates a ratchet which in turn will operate an incremental counter or a cam which will actuate a switch after a given number of cycles.

The present invention further comprehends the provision of a venturi tube in the main conduit and having pressure taps prior to and at the venturi throat. The pressure taps are connected to the inlet and the outlet of the metering device. The venturi tube permits a higher pressure differential between the pressure taps enabling operation of the metering device at very slow flow rates without a loss due to pressure drop in the venturi tube. Greater downstream pressure recovery is possible with a venturi tube than with a disc type orifice.

The present invention also comprehends the provision of a reciprocating supporting plate for the flexible diaphragm in the metering device and novel magnetic detent means to hold the supporting plate in position until the diaphragm has moved to substantially its opposite position and yet create the lowest possible resistance to movement of the plate. The supporting plates and magnetic detent means are balanced to the specific gravity of the fluid within which the plates are located to reduce substantially all internal frictional forces. The supporting plate will further amplify the effect of the pressure differential in the metering device.

The present invention also comprehends the provision of a novel sealed valve unit without stuffing box connections, through the use of the magnetic members which results in a simplified construction and operation without the frequent costly repairs.

A further object of the present invention is the provision of one or more orifices in the conduits or tubes connecting the metering device with the pressure taps of the venturi tube. The ratio of the orifice to the chamber in the metering device may be varied to alter the meter capacity per cycle.

In the drawings:

FIG. 3 is a cross sectional view taken on the line 3—3 of FIG. 2 and further showing the ports leading to the valve chambers with the valve member not shown.

FIG. 4 is a cross sectional view taken on the line 4—4 of FIG. 1 and showing the structure of the oscillating counter arm and ratchet of the counting device with the cam member removed for clarity.

FIG. 5 is a horizontal cross section taken on the line 5—5 of FIG. 1 and showing the cam member and the signalling mechanism which is operatively connected to the counting mechanism.

FIG. 6 is a vertical cross section taken on the line 6—6 of FIG. 4 and showing the port leading from the diaphragm chamber to a connecting tube leading to the four-way valve with the counting mechanism omitted.

Figure 1:
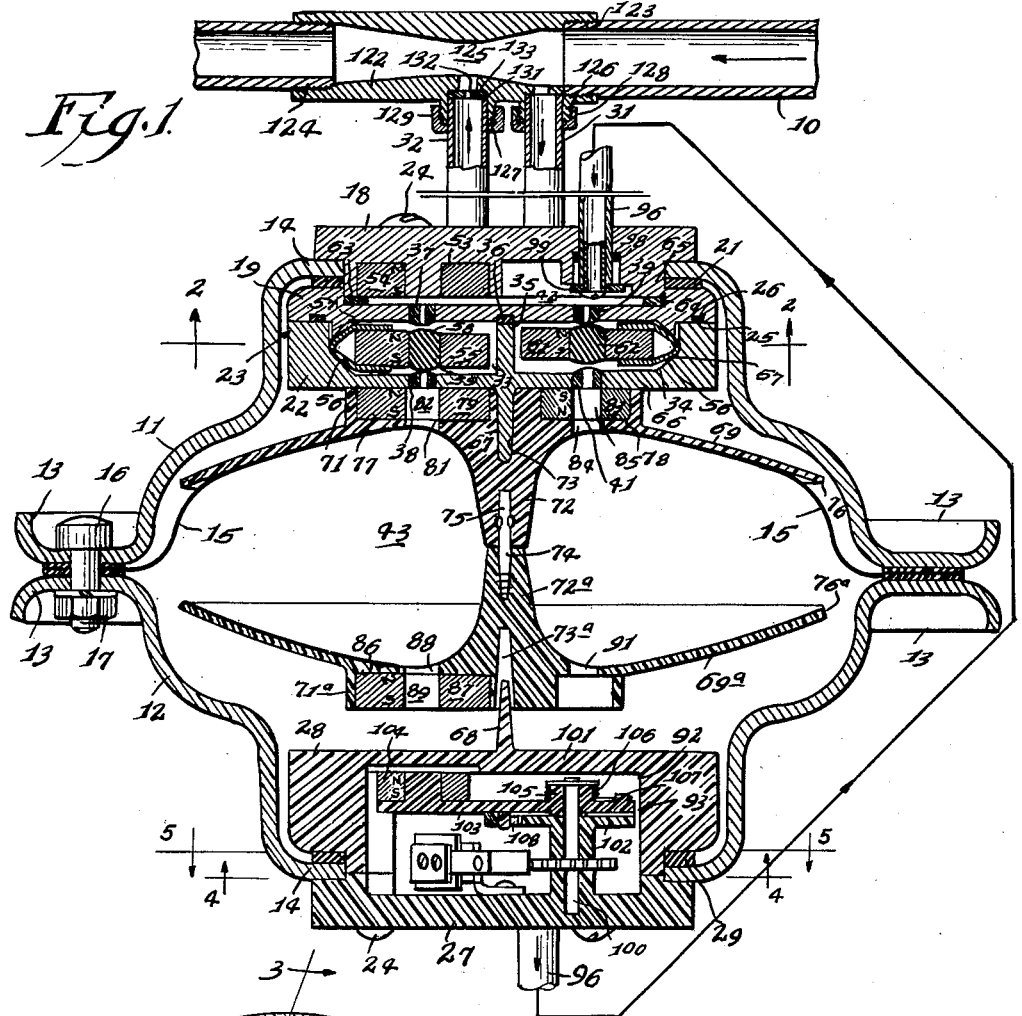
FIGURE 1 is a vertical cross sectional view of the metering device in connection with a Venturi tube in the main conduit and showing the four-way valve, the diaphragm in the metering chamber and the magnetic counter mechanism.

Referring particularly to the disclosure in the drawings and to the illustrative embodiment of the invention shown therein, FIG. 1 discloses the novel metering device to measure the flow of fluid through a main conduit 10 and having identical upper and lower body members 11 and 12 with outwardly extending peripheral flanges 13 and inwardly extending flanges 14. A thin flexible diaphragm 15 is clamped along its periphery between the flanges 13 of the members 11, 12, these members being clamped together by suitable securing means such as bolts 16 and nuts 17.

The flange 14 of the body member 11 is clamped between a top flanged cap 18 and a top valve body member 19. An annular sealing ring or gasket 21 is located between the flange 14 and the upper valve body member 19 to provide a fluid tight seal. A lower valve body member 22 adjoins the upper valve body member 19 to form a valve housing 23 for a four-way valve to be later described. The cap 18 and the valve body members 19 and 22 are secured together by screws or other suitable fastening means 24, an annular sealing gasket 25 being positioned in a groove 26 in the member 19 to provide a fluid tight valve housing.

Likewise, the flange 14 on the body member 12 is clamped between a bottom flanged cap 27 and a counter housing 28, an annular sealing gasket 29 being positioned between the flange 14 and the housing 28. Suitable fastening means 24 also secure the cap 27 and the counter housing 28 together. The counter housing and substantially all of the cycling and counting mechanism as well as the meter body and associated structure may be formed of plastic material to provide a device of lightness and durability.

An inlet tube 31 and an outlet tube 32 enter the metering device through the cap 18 and pass into one of the two valve chambers 33, 34 formed in the valve housing 23. Each chamber is circular with a central wall 35 dividing them; a sealing member 36 in the top valve body member 19 coacts with the wall 35 formed in the bottom valve body member 22 to seal the separate chambers. Upper and lower central valve ports 37, 38, 39 and 41 are formed in the valve body; the port 37 communicating between the chamber 33 and a chamber 42 formed between the cap 18 and the top valve body member 19; the port 38 communicating between the valve chamber 33 and the central diaphragm chamber 43; the port 39 between the valve chamber 34 and the chamber 42 and the port 41 between the valve chamber 34 and the diaphragm chamber 43.

Figure 2:
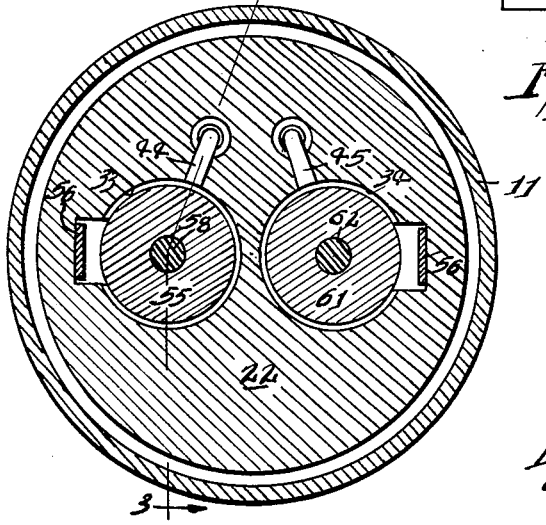
FIG. 2 is a cross sectional view taken on the line 2—2 of FIG. 1 looking in the direction of the arrows and showing the valve chamber and the inlet and outlet ports for the meter.

As seen in FIGS. 2 and 3, an outlet channel or passage 44 extends from the side of the valve chamber 33 to the outlet tube 32 and a similar inlet channel or passage 45 extends from the side of valve chamber 34 to the inlet tube 31. In each instance the channel or passage is formed in the lower valve body element 22 and a resilient sealing member 46 (see FIG. 3) is located in a recess 47 in the upper valve body member 19 above the channel 44 to seal the channel. An opening 48 in the sealing member 46 adjacent the termination of the channel 44 is aligned with an opening 49 in the upper valve body member 19. A cylindrical extension 51 in the member 19 extending the opening 49 projects into the outlet tube 32 in the cap 18. Sealing means such as a sealing ring 52 surrounds the tube 32 to hold the tube in place. A like structure is found for the inlet tube 31.

The cap 18 also includes a recess mounting 53 for an annular magnet 54 which is located directly over the chamber 33, but separated therefrom by the chamber 42 between the magnet 54 and the upper valve body element 19. Within the chamber 33, a second annular magnet 55 of equal strength with the magnet 54 is hingedly mounted, said hinge including a clip 56 holding the magnet 55 and mounted in a recess 57 in the side of the valve chamber 33. A resilient plug 58, preferably made of rubber, having slightly bulged ends is mounted in the central opening 59 in the magnet 55, said plug engaging and sealing either the port 37 or the port 38.

A similar magnet 61 having a resilient central plug 62 is hingedly mounted in the valve chamber 34 in the same fashion as the magnet 55, said plug sealing either the port 39 or the port 41. A second annular sealing gasket 63 is found in a central recess 64 in the top valve body element 19 between the element 19 and an annular downwardly extending flange 65 on the cap 18. The wall 66 between the valve chambers 33, 34 and the diaphragm chamber 43 is of the same thickness as the upper valve body element 19 separating these chambers from the chamber 42.

Extending centrally from the lower valve body member 22 and from the counter body member 28 into the diaphragm chamber 43 are the plate guides 67 and 68, respectively. These guides position and direct reciprocal movement of support plates 69 and 69a which support the thin flexible diaphragm 15. Each plate 69, 69a is of a dished shape with a central circular base 71, 71a on the convex side of the plate 69, 69a and a central projection or extension 72, 72a on the concave side. A blind opening 73, 73a is found in the central base 71, 71a of each plate to receive one of the plate guides 67 or 68. The plates are positioned with their concave sides facing inward and the central projections or extensions 72, 72a abutting the center of the diaphragm 15. A screw threaded fastener 74 has its upper shank 75 imbedded in the extension 72 of the plate 69 and passes through the diaphragm 15 and is screwed into the extension 72a of the plate 69a to form a rigid structure with the outer edges 76, 76a of the plates 69, 69a spaced apart.

The central base 71 of the upper plate 69 has a large recess 77 aligned with the valve chamber 33 and a smaller recess 78 aligned with the valve chamber 34. An annular magnet 79 of equal strength with the magnets 54, 55 and 61 is secured in the recess 77, and an opening 81 through the plate 69 is aligned with the central opening 82 in the magnet 79. A smaller annular magnet 83 of less strength than the magnet 79 is mounted in the recess 78 with an opening 84 through the plate 69 aligned with the opening 85 in the magnet. The central base 71a of the lower plate 69a has a recess 86 opposite the recess 77 to accommodate a magnet 87 and an opening 88 is formed in the plate 69a in alignment with the central opening 89 of the magnet 87. A second opening 91 through the lower plate 69a is aligned with the magnet 83. The magnet 87 is of a strength equal to that of the magnets 54, 55, 61 and 79.

The counter housing 28 and the cap 27 have a chamber 92 formed therein to house a counter mechanism 93 and a signalling mechanism 110. As shown in FIG. 6, a passage 94 extends through the counter housing 28 and terminates in a cylindrical extension 95 which is received within a tube 96 passing through the cap 27. Suitable sealing means 97 surround the tube 96 in the cap 27. The tube 96 extends around the metering device and enters the cap 18 to communicate with the chamber 42. Suitable sealing means 98 surrounds the lower end of the tube 96 in the cap 18, and a flanged fitting 99 has a central extension received within the tube. This fitting is secured to the cap by suitable fastening means.

A pin or shaft 100 is stationarily mounted or imbedded in the cap 27 and projects upwardly to adjacent the wall 101 of the counter housing 28. A ratchet 102 has a central opening to receive the pin or shaft 100 and rotatably mount the ratchet thereon, and above the ratchet an oscillating arm 103 having an opening adjacent one end to receive the shaft 100 is mounted on the shaft for limited movement. The arm 103 has mounted on its free end a magnet 104 which is attracted by the magnet 87 when said magnet is in close proximity. The arm has an upwardly extending hub 105 surrounding the shaft 100, and a coil spring 106 surrounds the hub and has one end secured to the shaft 100 and the other end bearing against a projection 107 on the arm 103. Mounted on the underside of the arm 103 is a spring blade pawl 108 which moves with the arm to rotate the ratchet 102 (see FIG. 4). A second spring blade pawl 109 is fixed in position in the counter housing 28 to prevent rotation of the ratchet 102 in a direction opposite to that when moved by the pawl 108.

The signalling mechanism 110 includes a cam member 111 which is keyed to the ratchet 102 by a hollow shaft 112 depending from the ratchet 102 and having a square or rectangular projection 112$^a$ which is received in a complementary opening 112$^b$ in the cam member 111 to rotate therewith. The cam 111 consists of a plurality of projections 113 and notches or valleys 114 which actuate movement of a switch arm 115 which is urged against the cam. The arm 115 has a contact 116, and a pair of spaced contacts 117 and 118 on parallel arms 119 and 120, respectively, are mounted in a switch body 121 and are located so that when the switch arm 115 rests in a valley 114 the contact 116 abuts the contact 117, and when the arm rests on a projection 113 the contact 116 abuts the other contact 118. This engagement between two of the contacts will operate to provide an electrical signal for the actuation of an associated device. As seen in FIG. 5, the switch, utilizing contacts 116 and 117, is actuated on every other increment of rotation of the ratchet 102 or every other cycle of the diaphragm 15. This cam 111 can be interchanged with other cams to provide actuation of the switch after 4, 6, 8, 10 or 12 increments of rotation of the ratchet 102.

Referring to FIG. 1, the main conduit 10 carrying the flow of liquid to be metered contains a Venturi tube 122. The tube is secured in the conduit 10 by screw threads 123 on the interior surface of the ends of the tube which are engaged by the threaded ends 124 of the conduit. The Venturi tube includes a throat 125 and a pair of pressure taps, 126, 127; the pressure tap 126 located ahead of the throat 125 and the tap 127 located at the throat. The inlet tube 31 of the metering device is connected to the tap 126 by a threaded cap 128 engaging the external threads on the tap. Likewise, the outlet tube 32 is connected to the tap 127 by engagement of the threaded cap 129 with the external threads on the tap. A disc type orifice plate 131 having an orifice 132 is clamped in the tap 127 between a shoulder 133 and the end of the tube 32.

The diaphragm chamber 43 of the metering device is of a known capacity, and the diameter of the orifice 132 is also known. From these known quantities, it can be determined how much liquid will pass through the Venturi tube 122 of a given size during a cycle of the diaphragm 15 in the metering device; one cycle being the passage of twice the capacity of the diaphragm chamber 43 through the device due to the pressure differential between the taps 126 and 127.

To more fully understand the cycle of the diaphragm 15, the operation of the meter will be described. With the support plates 69, 69$^a$ and diaphragm 15 in their upper positions as shown in FIG. 1, the magnet 79 is nearer the valve chamber 33 than the magnet 54 in view of the chamber 42 between the cap 18 and the upper valve housing member 19, and attracts the magnet 55 to its lower position so that the plug 58 closes the valve port 38. Since both magnets 55 and 61 have their north poles at the top, the magnetic field created in the valve housing 23 will cause the magnet 61 to pivot to a position opposite to the magnet 55 and close the upper valve port 39. The magnet 83 having its south pole uppermost aids in positioning the magnets 55 and 61 by repelling the magnet 61 toward the port 39. Also, the arm 103 of the counter mechanism 93 is in its full line position shown in FIG. 4, due to the action of the coil spring 106.

Liquid will pass through the inlet tube 31 due to the pressure differential in the Venturi tube 122, flow being limited by the orifice 132 in the pressure tap 127. The liquid passes through the channel 45, into the chamber 34, and through the lower port 41 into the diaphragm chamber 43. Simultaneously, liquid in the chamber 43 below the diaphragm 15 is urged by movement of the diaphragm through the opening 91, the passage 94, the tube 96, the chamber 42, the port 37 into the valve chamber 33, through the channel 44, the outlet tube 32 and the orifice plate 131 into the Venturi tube 122 at the throat 125. This flow pattern continues as the diaphragm 15 slowly moves downward until it is against the lower support plate 69$^a$ at which time the pressure above the diaphragm causes the diaphragm and support plates 69, 69$^a$ to shift to their lower position with the plate 69$^a$ abutting the counter housing 28.

When the plates shift, the magnet 79 will be moved farther from the magnet 55 than the magnet 54 so that attraction between the magnets 54 and 55 will cause the magnet 55 to shift to close the port 37. Because of the magnetic field, the magnet 61 in chamber 34 will shift to close the port 41. Also the magnet 87 in the plate 69$^a$ will attract the magnet 104 on the arm 103 causing the arm to shift to its dotted line position against the spring 106. (See FIG. 4). The pawl 108 on the arm 103 will engage a tooth of the ratchet 102 and urge the ratchet to rotate through one increment. The pawl 109 allows the ratchet 102 to rotate in the direction of the arrow.

Liquid passing into the valve chamber 34 will now pass through the port 39, chamber 42, the tube 96, the passage 94 and the opening 91 into the diaphragm chamber 43 below the diaphragm 15. This liquid will cause the diaphragm 15 to move upward and the liquid above the diaphragm passes through the opening 81 and port 38 into the chamber 33, through the channel 44 and the tube 32 to the pressure tap 127 and through the orifice plate 131. When the diaphragm 15 is supported on the plate 69, further pressure causes the plates 69, 69$^a$ and the diaphragm 15 to shift back to their upper position. The magnets 55 and 61 will again shift, and the arm 103 shifts under influence of the spring 106 to its solid line position. When the arm 103 moves to its original position, the pawl 109 engages a tooth of the ratchet 102 to prevent movement of the ratchet while the pawl 108 is moving with the arm 103.

The cam member 111 rotates when the ratchet 102 rotates and will close the contacts 116, 117 to send a signal to a related device on a given number of increments of rotation. The magnets 79 and 87 act as detent means for the support plates 69, 69$^a$ to hold these plates in either the upper or lower position until the diaphragm 15 has completely shifted its position. This lock-out feature of the magnets 79 and 87 affords great accuracy and efficiency at either very high or very low fluid flow rates. The plates 69, 69$^a$ are made of a suitable plastic and the specific gravity of the diaphragm assembly, including the diaphragm 15, the plates 69, 69$^a$ and the magnets 79, 83 and 87, is adjusted to be approximately equal to the specific gravity of the liquid in the chamber 43 to decrease resistance to movement of the assembly. The strength of the magnets 54, 55, 61 and 79 must be adjusted so that the magnets 55 and 61 will have sufficient force to retain their positions closing the valve ports against the pressure of the liquid. One further advantage of the magnets in the valve construction is that they eliminate stuffing box connections and snap detents.

Thus, we have disclosed a novel water metering device which can be used in several ways. The counting mechanism can be connected to a visual indicating means calibrated to show the volume of liquid which has passed through the conduit. Another way is to use the signalling mechanism to indicate when tanks are to be switched from service to regeneration in a multi-tank softener system. Or the signalling mechanism can be connected to some other related device. While a metering device of a particular and effective shape and relationship of parts has been shown and described by way of illustration, it is not our intent or desire to unnecessarily restrict the improvement by virtue of this limited showing. It is also contemplated that specific descriptive terms employed herein be given the broadest possible interpretation consistent with the actual disclosure.

Having thus disclosed the invention, we claim:

1. A four-way valve comprising a valve housing, two valve chambers in said housing, an inlet passage leading to one chamber, an outlet passage leading from the other chamber, a pair of opposed ports in each chamber, a hinged valve member in each chamber adapted to pivot and seat against one of the two opposed ports, means to cause each of said valve members to simultaneously move in opposite directions for respectively closing and opening the ports in each chamber and separate means for reversing the direction of movement of said valve members in their respective chambers.

2. A four-way valve as set forth in claim 1, in which the means to cause opposite movement of the valve members includes annular magnets as the valve members, said magnets having their north and south poles adjacent one another and creating a magnetic field to cause the opposite movement of the valve members.

3. A four-way valve as set forth in claim 1, in which said actuating means includes a stationary magnet aligned with but spaced from one of said valve chambers, and a reciprocable magnet which in one position is nearer the valve chamber than the stationary magnet and in a second position is farther from the valve chamber, said valve member being attracted to the closest magnet.

4. A magnetically actuated four-way valve comprising a valve housing, a pair of valve chambers in said housing and separated by a central wall, an inlet passage entering the side of one chamber, an outlet passage leaving from the side of the other chamber, a pair of opposite aligned valve ports in the top and bottom of each chamber, a magnet hingedly mounted in each chamber to pivotally move to seal one of the two opposed ports, said magnets having their north and south poles adjacent one another creating a magnet field causing the magnets to simultaneously move in opposite directions, and means to actuate said magnets to shift from one valve port to the opposite port.

5. A magnetically actuated four-way valve as set forth in claim 4, in which said magnets are flat annular members having central openings and fit within cylindrical valve chambers, and a plug of resilient material mounted within the central opening is each magnet to engage one of the two opposite valve ports in a chamber.

6. A magnetically actuated four-way valve as set forth in claim 4, in which a third magnet is stationarily mounted in spaced relation above and aligned with one of said valve chambers to constantly attract the magnet within said valve chamber, and a fourth magnet is mounted below and aligned with said last mentioned valve chamber and means to reciprocate said fourth magnet between a position adjacent said valve chamber and a position spaced from said valve chamber.

7. A metering device connected to the pressure taps of a Venturi tube to measure the flow of fluid through said tube, comprising a housing having a central chamber and reduced end chambers, a valve housing in one of said end chambers, a counter housing in the other of said end chambers, an inlet tube and an outlet tube communicating between said Venturi tube and said housing, a four-way valve in said valve housing, said inlet and outlet tubes communicating with said valve, valve ports leading from said valve to said central chamber, a flexible diaphragm is said central chamber, a counting device in said counter housing to record the cycles of the diaphragm, and a tube leading from the side of said diaphragm adjacent said counter housing to said four-way valve.

8. A metering device connected to the pressure taps of a Venturi tube as set forth in claim 7, in which the inlet tube is connected to the pressure tap prior to the Venturi throat and the outlet tube is connected to the pressure tap at the Venturi throat such that any pressure differential in the Venturi tube will cause flow through said metering device.

9. A counting device comprising a housing, a stationary shaft mounted in said housing, an oscillating arm mounted at one end on said shaft for limited movement and having one end free, a ratchet having a central opening fitting over said shaft for rotary movement relative thereto, a pawl mounted in said housing and engaging said ratchet to prevent rotation in one direction, a second pawl mounted on said arm and moving therewith, said second pawl engaging said ratchet to provide incremental rotary motion of said ratchet as said arm oscillates, a hub on said arm surrounding said shaft, a coil spring surrounding said hub and having one end stationarily secured to said shaft, the opposite end of said spring engaging said arm to yieldably bias the arm in a direction opposite to the rotation of said ratchet, a magnet secured to said free end of the arm, and a second magnet mounted for reciprocatory motion toward and away from said first magnet, said magnets attracting one another when in close proximity to urge said arm in one direction against said spring.

10. A counting device as set forth in claim 9, in which a cam member is rotatably mounted on said shaft and is keyed to said ratchet to rotate therewith, a switch having an arm biased against said cam member, said cam member adapted to actuate said switch after a given number of increments of rotation.

11. A metering device operated by the pressure differential created by a restriction in a conduit carrying the fluid to be measured, comprising a housing having a central chamber, a four-way valve, an inlet tube communicating with said conduit and said valve, an outlet tube communicating with said conduit and said valve, at least one valve port between said valve and said central chamber, a flexible diaphragm extending across said central chamber and having its periphery clamped within said housing, said diaphragm being of such dimensions as to conform to the upper surface and the lower surface of said central chamber, a return tube communicating between the central chamber below said diaphragm and said valve, and a counting device in said housing below said central chamber.

12. A metering device as set forth in claim 11, in which a flow limiting restriction is located in said outlet tube and, with the known volume of the central chamber, the flow through the main conduit can be determined.

13. A measuring device as set forth in claim 11, in which a pair of dished diaphragm support plates are secured face to face at the center of said diaphragm, said plates having central projections which are secured together so that the edges of the plates are spaced apart, the plates adapted to reciprocate in the central chamber with said diaphragm, and means on said valve and said counting device to guide the reciprocatory movement of the plates.

14. A measuring device as set forth in claim 13, in which a magnetic detent is imbedded in each support plate tending to hold said plates in either of their two positions.

15. A measuring device as set forth in claim 13, in which said counting device comprises a housing, a stationary shaft mounted in said housing, an arm mounted for limited oscillating movement on said shaft, a resilient means yieldably biasing said arm in one direction of rotation, a ratchet rotatably mounted on said shaft, a pawl mounted on said arm for movement therewith and engaging said ratchet to provide incremental rotation of said ratchet in the opposite direction, a second pawl mounted on said housing and engaging said ratchet to prevent rotation of the ratchet in the first mentioned direction of rotation, a magnet on the end of said arm, and a magnet in the lower supporting plate attracting said magnet on the oscillating arm when said diaphragm and support plates reach their lower position.

16. A measuring device as set forth in claim 15, in which a cam is rotatably mounted on said shaft and keyed to said ratchet to rotate simultaneously therewith, and signalling means actuated by rotation of said cam.

17. A measuring device operated by the pressure differential created by a restriction in a conduit carrying the fluid to be measured, comprising a housing, a central chamber in said housing, a flexible diaphragm extending across said chamber and having its periphery clamped in said housing, a valve housing above said central chamber, a four-way valve in said valve housing, an inlet tube communicating between said conduit prior to the restriction and said valve, an outlet tube communicating between said conduit at said restriction and said valve, a return tube communicating between said central chamber below said diaphragm and said valve, a valve port communicating between said valve and said central chamber above said diaphragm, a pair of upper and lower diaphragm support plates, each plate having a base and a central projection, said plates being joined together at their central projections at the center of said diaphragm and mounted for reciprocatory movement, said plates being bowed outwardly and having their outer edges spaced apart, a counter housing below said central chamber, plate guides extending into said central chamber from said valve housing and said counter housing, a magnet imbedded in the base of each support plate and adapted to hold the plates in either of their two positions, and a counting device in said counter housing to record the number of cycles of movement of said diaphragm and said support plates, said magnet in the base of the lower support plate adapted to actuate said counting device as said magnet reciprocates.

18. A measuring device as set forth in claim 17, in which the counting device includes a stationary shaft, an oscillating arm mounted on said shaft for limited movement and having a magnet on the free end of the arm, a spring yieldably urging said arm in one direction, a ratchet rotatably mounted on the shaft, a pawl on said arm adapted to rotate said ratchet in increments in the opposite direction, means to prevent rotation of said ratchet in the first mentioned direction, a cam rotatably mounted on said shaft and keyed to said ratchet, and switch means actuated by said cam to indicate the cycles of said diaphragm, said magnet imbedded in said lower support plate attracting said magnet on said arm to cause the arm to move against the force of the spring when said support plates are in their lower position.

19. A measuring device as set forth in claim 17, in which said valve includes a pair of flat valve chambers, a passage in one chamber leading to said inlet tube, a passage in the other chamber leading to said outlet tube, each chamber having a pair of opposed ports, the lower port of each chamber leading to said central chamber, a valve member in each chamber and hinged at one side of said chamber to close one of the two opposed ports, means to position said valve members in opposite positions, and separate means to actuate said valve members upon movement of said diaphragm and said support plates.

20. A measuring device as set forth in claim 19, in which said valve members are annular magnets, a resilient plug mounted in the central opening of each magnet and adapted to engage either one of the opposite valve ports in each chamber, said magnets creating a magnetic field causing the magnets to assume opposite positions in their respective chambers, an annular magnet aligned with one of the valve chambers and imbedded in the base of the upper support plate, said last mentioned magnet attracting said aligned magnet in its valve chamber when the plates are in their upper position, and a stationary magnet aligned with the last mentioned valve chamber and contained magnet and mounted above said valve chamber, said stationary magnet attracting said magnet in the last mentioned valve chamber when the support plates are in their lower position.

21. A measuring device as set forth in claim 20, in which said magnet imbedded in the upper support plate and adapted to hold said plates in their upper poistion is separate from said valve actuating magnet and repels the aligned magnet in the second valve chamber, and a chamber is formed in said housing of the measuring device above said valve housing and separates said stationary magnet from said valve housing, said upper valve ports in said valve housing and said return tube opening into said chamber.

References Cited in the file of this patent
UNITED STATES PATENTS

| | | |
|---|---|---|
| 16,284 | Mason | Dec. 23, 1856 |
| 731,899 | Hazlett | June 23, 1903 |
| 2,335,023 | Payne | Nov. 23, 1943 |
| 2,575,086 | Atchison | Nov. 13, 1951 |
| 2,731,625 | Melcher et al. | Jan. 17, 1956 |

FOREIGN PATENTS

| | | |
|---|---|---|
| 1,077,943 | France | May 5, 1954 |